US007730151B1

(12) United States Patent
Fabbri et al.

(10) Patent No.: US 7,730,151 B1
(45) Date of Patent: Jun. 1, 2010

(54) METHODS AND APPARATUS FOR MAINTAINING ONLINE PREFERENCES

(75) Inventors: Jason Christopher Fabbri, Roseville, CA (US); Allan Morgan Young, Santa Rosa, CA (US); Alexander Robert Dixon, Minneapolis, MN (US); Christopher Frederic Haupt, Auburn, CA (US)

(73) Assignee: Adobe Systems Inc., San Jose, CA (US)

( * ) Notice: Subject to any disclaimer, the term of this patent is extended or adjusted under 35 U.S.C. 154(b) by 1125 days.

(21) Appl. No.: 11/336,266

(22) Filed: Jan. 20, 2006

(51) Int. Cl.
*G06F 15/16* (2006.01)
(52) U.S. Cl. ................................................. 709/207
(58) Field of Classification Search ............. 726/4, 726/9, 3, 5, 27, 26, 19, 18, 17, 14, 12, 11; 709/246, 244, 242, 240, 225, 218, 220, 238, 709/237, 236, 233, 232, 231, 230, 229, 228, 709/227, 226, 224, 223, 245; 707/1, 5; 715/780; 725/35; 705/65, 64, 51, 50, 44, 37, 30, 27, 705/26, 14, 10, 1
See application file for complete search history.

(56) References Cited

U.S. PATENT DOCUMENTS

| 5,875,296 | A | * | 2/1999 | Shi et al. | 726/5 |
|---|---|---|---|---|---|
| 6,643,665 | B2 | * | 11/2003 | Kimbell et al. | 707/104.1 |
| 6,651,217 | B1 | * | 11/2003 | Kennedy et al. | 715/224 |
| 6,789,075 | B1 | * | 9/2004 | Nielsen | 707/5 |
| 7,379,980 | B1 | * | 5/2008 | Gilbert | 709/220 |
| 2002/0184338 | A1 | * | 12/2002 | Haines et al. | 709/218 |
| 2005/0246736 | A1 | * | 11/2005 | Beyda et al. | 725/35 |
| 2006/0036503 | A1 | * | 2/2006 | Schweier et al. | 705/26 |
| 2006/0059434 | A1 | * | 3/2006 | Boss et al. | 715/780 |
| 2006/0195790 | A1 | * | 8/2006 | Beaupre et al. | 715/727 |
| 2008/0154632 | A1 | * | 6/2008 | Jacobi et al. | 705/1 |

OTHER PUBLICATIONS

Mike Pope, Basics of Cookies in ASP.NET, Jan. 2003, Microsoft Basic User education, Microsoft Corporation.*

* cited by examiner

*Primary Examiner*—Wing F Chan
*Assistant Examiner*—Charles Murphy
(74) *Attorney, Agent, or Firm*—Chapin IP Law, LLC

(57) ABSTRACT

At a service provider, a system receives recipient information containing preferences to be used in an online transaction. The recipient information is received from a client. At the service provider, the system associates the recipient information with the client from which the recipient information was received, and stores the recipient information at the client. The recipient information contains preferences to be used in the online transaction.

21 Claims, 5 Drawing Sheets

209 ASSOCIATE, AT THE SERVICE PROVIDER, THE RECIPIENT INFORMATION WITH THE CLIENT FROM WHICH THE RECIPIENT INFORMATION WAS RECEIVED

210 ESTABLISH A UNIQUE IDENTIFIER FOR THE RECIPIENT INFORMATION

211 ASSOCIATE THE UNIQUE IDENTIFIER WITH
I) THE RECIPIENT INFORMATION
II) A WEB SITE ON WHICH THE RECIPIENT INFORMATION WAS CAPTURED
III) THE CLIENT ON WHICH THE RECIPIENT INFORMATION IS STORED

OR

212 ESTABLISH A UNIQUE IDENTIFIER FOR EACH RECIPIENT CONTAINED WITHIN THE PLURALITY OF RECIPIENTS

213 ESTABLISH A UNIQUE PREFERENCE IDENTIFIER FOR EACH OF THE PLURALITY OF PREFERENCES ASSOCIATED WITH EACH RECIPIENT CONTAINED WITHIN THE PLURALITY OF RECIPIENTS

*FIG. 3*

214 ASSOCIATE, AT THE SERVICE PROVIDER, THE RECIPIENT INFORMATION WITH THE CLIENT FROM WHICH THE RECIPIENT INFORMATION WAS RECEIVED

215 RECEIVE FROM A USER, A POLICY TO BE ASSOCIATED WITH THE RECIPIENT INFORMATION

216 IDENTIFY ONE OF THE PLURALITY OF PREFERENCES AS A DEFAULT PREFERENCE

↓

217 ASSOCIATE THE DEFAULT PREFERENCE WITH THE RESPECTIVE RECIPIENT ASSOCIATED WITH THE PLURALITY OF PREFERENCES

↓

218 ESTABLISH A UNIQUE DEFAULT PREFERENCE IDENTIFIER WITH THE DEFAULT PREFERENCE ASSOCIATED WITH THE RESPECTIVE RECIPIENT ASSOCIATED WITH THE PLURALITY OF PREFERENCES

OR

219 ASSOCIATE AT LEAST ONE PREFERENCE FROM THE PLURALITY OF PREFERENCES WITH THE RECIPIENT INFORMATION ASSOCIATED WITH THE PLURALITY OF RECIPIENTS

FIG. 4

METHODS AND APPARATUS FOR MAINTAINING ONLINE PREFERENCES

BACKGROUND

Conventional technologies for interacting with users who visit a web site utilize the technology referred to as a 'cookie'. Within the realm of computer science, the definition of a cookie is an opaque container of data held by an intermediary. Within the realm of web sites, a cookie is data that is stored on the user's computer. Within the realm of web sites, a cookie can also be an opaque container of data. When the user visits a web site, information about the user (i.e., the user's mailing address, etc) is stored on the user's computer. When the user revisits that web site, the web site 'remembers' those details (i.e., the user's mailing address, etc) about the user.

Conventional technologies for online shopping allow a user to enter details, such as mailing addresses of the user and/or recipients for whom the user is purchasing items online. Users can assign names to individual mailing addresses, such as "Mom", Aunt", etc, such that when the user orders an item online, the user can specify, during the ordering process, which of the stored addresses should be used as a shipping address, when the selected item is shipped.

SUMMARY

Conventional technologies for storing data in a cookie (i.e., an opaque container of data held by an intermediary) for use during online shopping suffer from a variety of deficiencies. In particular, conventional technologies for storing data in a cookie for use during online shopping are limited in that conventional web browser cookies are generally limited by size constraints. Also, there exists a one to one correlation between the cookie and the web site at which that cookie can be used; meaning the same cookie used for one web site cannot be used for another web site. Some web sites track a user's purchases, and can remind a user which of the items the user has purchased in the past. However, those web sites are not able to correlate previous purchase preferences with respective recipients, and provide that data to the user to enable the user to make appropriate selections (for various recipients) during online shopping. Those websites only correlate the preferences with the user who made the purchase.

Embodiments disclosed herein significantly overcome such deficiencies and provide a system that includes a computer system executing an online preference providing process. The online preference providing process allows a user to assign preferences (such as clothing sizes, preferred color choices, etc) for various recipients when ordering online. The data related to the recipients' preferences is stored on the user's computer as a cookie with a unique identifier. When the user is making an online purchase at a web site, that web site is pre-populated with the recipients and their preferences (via the cookie transmitted to the web site). The user can add, modify, and/or delete recipients via a graphical user interface on the user's computer. The cookie can be used for multiple web sites. It should be noted that the term 'cookie' denotes both a cookie in the conventional definition for use on a website, as well as the technical definition of an opaque container of data.

Embodiments disclosed herein provide a system that includes a computer system executing an online preference providing process. At a service provider, the online preference providing process receives recipient information containing preferences to be used in an online transaction. The recipient information is received from a client. At the service provider, the online preference providing process associates the recipient information with the client (from which the recipient information was received), and stores the recipient information at the client, along with a unique identifier. The recipient information contains preferences to be used in the online transaction.

During an example operation of one embodiment, suppose a user is ordering photograph prints of children, from an online photograph processing web site. The user is ordering photograph prints for various relatives. Each relative prefers a different size of photograph prints, or prefers items (such as a coffee mug, mouse pad, etc.) printed with a photograph, instead of photograph prints. For example, Dad may prefer wallet size prints, to keep in his wallet so that he can show his co-workers pictures of his children. Grandma may prefer eight inch by ten inch photographs to place on the mantel in the living room, along with the pictures of the other grandchildren. Uncle, a computer aficionado, may prefer pictures of the children to be made into a computer mouse pad that he'll use in his home office.

During an online transaction of ordering prints of the children, the user selects the photographs the user will purchase, the recipients who will receive those photographs, and the preferences of those recipients. The online preference providing process receives this data, and associates this data with the user. The data is then stored as a cookie on the user's computer with a unique identifier. During a subsequent online transaction, when the user enters the photograph processing web site, the online preference providing process uploads the data from the cookie stored on the user's computer, and pre-populates the web site with the photograph preferences of all the recipients. Thus, when the user selects photograph prints to purchase, and tags those photograph prints as being sent to Dad, Grandma, and Uncle, the web site is pre-populated with the photograph preferences of those three recipients, saving the user the task of entering (and remembering) all the preference information for each recipient. The user can add recipients, modify and/or delete recipient information via a graphical user interface at the user's computer.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The embodiments disclosed herein may be employed in data communications devices and other computerized devices and software systems for such devices such as those manufactured by Adobe Systems, Inc., of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 3 illustrates a flowchart of a procedure performed by the system of FIG. 1 when the online preference providing process associates, at the service provider, the recipient information with the client from which the recipient information was received, and assigns that recipient information a unique identifier, according to one embodiment disclosed herein.

FIG. 4 illustrates a flowchart of a procedure performed by the system of FIG. 1 when the online preference providing process associates, at the service provider, the recipient information with the client from which the recipient information was received, and associates a policy with that recipient information, according to one embodiment disclosed herein.

DETAILED DESCRIPTION

Embodiments disclosed herein include methods and a computer system that perform an online preference providing process. The online preference providing process allows a user to assign preferences for various recipients when ordering online. The data related to the recipients' preferences is stored on the user's computer. In one embodiment, the recipients' preferences are stored as a cookie. When the user is making an online purchase at a web site, that web site is pre-populated with the recipient's preferences (via the cookie transmitted to the web site). The user can add, modify, and/or delete recipients via a graphical user interface on the user's computer. It should be noted that the term 'cookie' denotes both a cookie in the conventional definition for use on a website, as well as the technical definition of an opaque container of data.

At a service provider, the online preference providing process receives recipient information containing preferences to be used in an online transaction. The recipient information is received from a client. At the service provider, the online preference providing process associates the recipient information with the client (from which the recipient information was received), and stores the recipient information at the client. The recipient information contains preferences to be used in the online transaction.

It should be noted that embodiments disclosed herein can apply to any client to server based purchase transaction.

Figure 1:
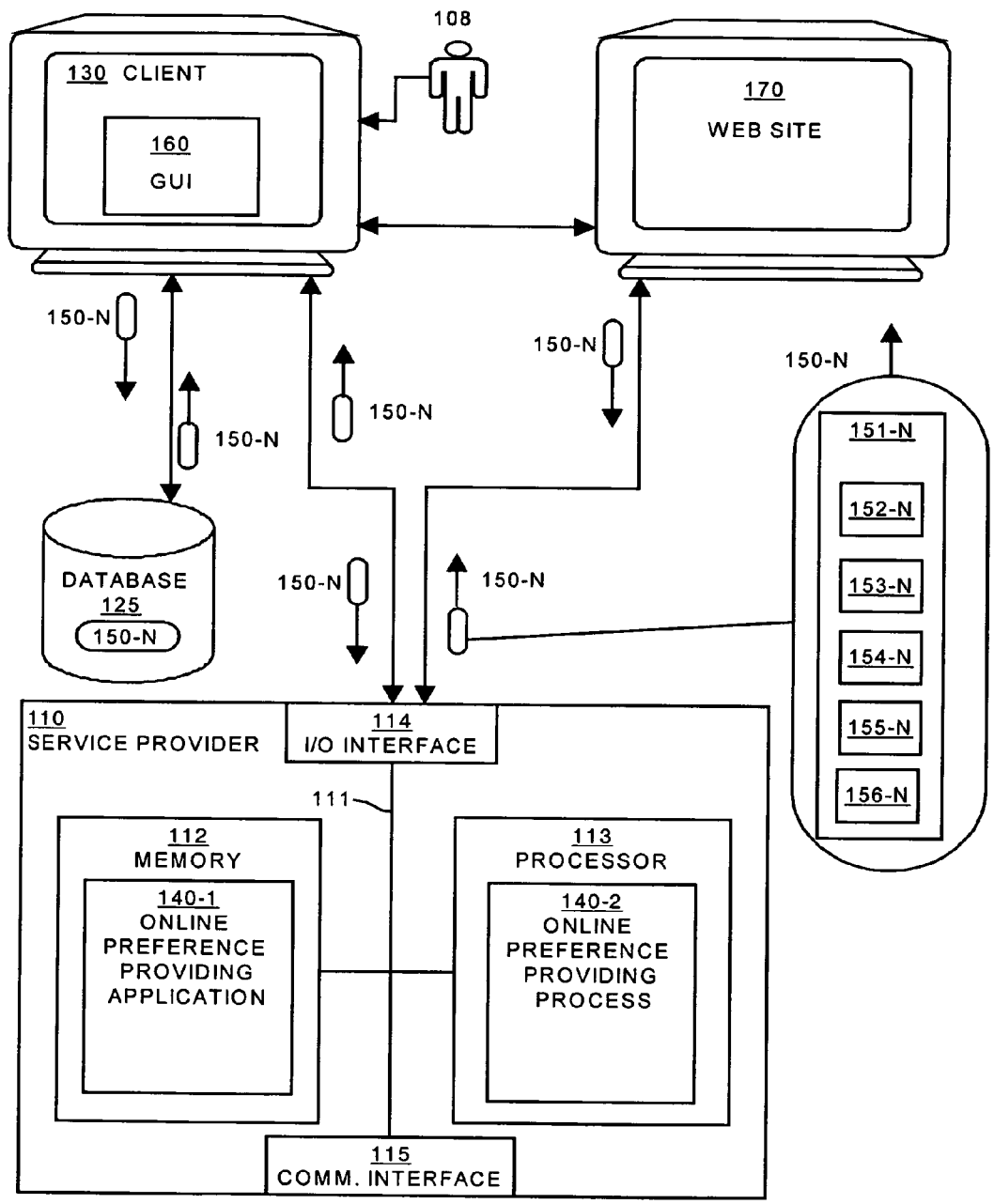
FIG. 1 shows a high-level block diagram of a computer system according to one embodiment disclosed herein.

FIG. 1 is a block diagram illustrating example architecture of a service provider 110 that executes, runs, interprets, operates or otherwise performs a online preference providing application 140-1 and online preference providing process 140-2 suitable for use in explaining example configurations disclosed herein. The service provider 110 may be any type of computerized device such as a personal computer, workstation, portable computing device, console, laptop, network terminal or the like. As shown in this example, the service provider 110 includes an interconnection mechanism 111 such as a data bus or other circuitry that couples a memory system 112, a processor 113, an input/output interface 114, and a communications interface 115. The communications interface 115 enables the service provider 110 to communicate with other devices, such as a client 130 and a web site 170.

The client 130 receives input from a user 108 to access the web site 170. Via the web site 170, or the graphical user interface 160, the user 108 identifies recipient information 151-N that is stored within a cookie 150-1. The cookie 150-1 is stored on the client 130. In an example configuration, the cookie 150-1 is stored in a database 125. The recipient information 151-N can also contain preferences 152-N, a unique identifier 153-1, policies 154-N related to the preferences 152-N, a default preference 155-1, and a unique default preference identifier 156-1.

The memory system 112 is any type of computer readable medium, and in this example, is encoded with an online preference providing application 140-1 as explained herein. The online preference providing application 140-1 may be embodied as software code such as data and/or logic instructions (e.g., code stored in the memory or on another computer readable medium such as a removable disk) that supports processing functionality according to different embodiments described herein. During operation of the service provider 110, the processor 113 accesses the memory system 112 via the interconnect 111 in order to launch, run, execute, interpret or otherwise perform the logic instructions of the online preference providing application 140-1. Execution of the online preference providing application 140-1 in this manner produces processing functionality in an online preference providing process 140-2. In other words, the online preference providing process 140-2 represents one or more portions or runtime instances of the online preference providing application 140-1 (or the entire online preference providing application 140-1) performing or executing within or upon the processor 113 in the computerized device 110 at runtime.

It is noted that example configurations disclosed herein include the online preference providing application 140-1 itself (i.e., in the form of un-executed or non-performing logic instructions and/or data). The online preference providing application 140-1 may be stored on a computer readable medium (such as a floppy disk), hard disk, electronic, magnetic, optical, or other computer readable medium. The online preference providing application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the online preference providing application 140-1 in the processor 113 as the online preference providing process 140-2 including the managing application process 150. Those skilled in the art will understand that the service provider 110 may include other processes and/or software and hardware components, such as an operating system not shown in this example.

Further details of configurations explained herein will now be provided with respect to a flow chart of processing steps that show the high level operations disclosed herein to perform the online preference providing process 140-2.

Figure 2:
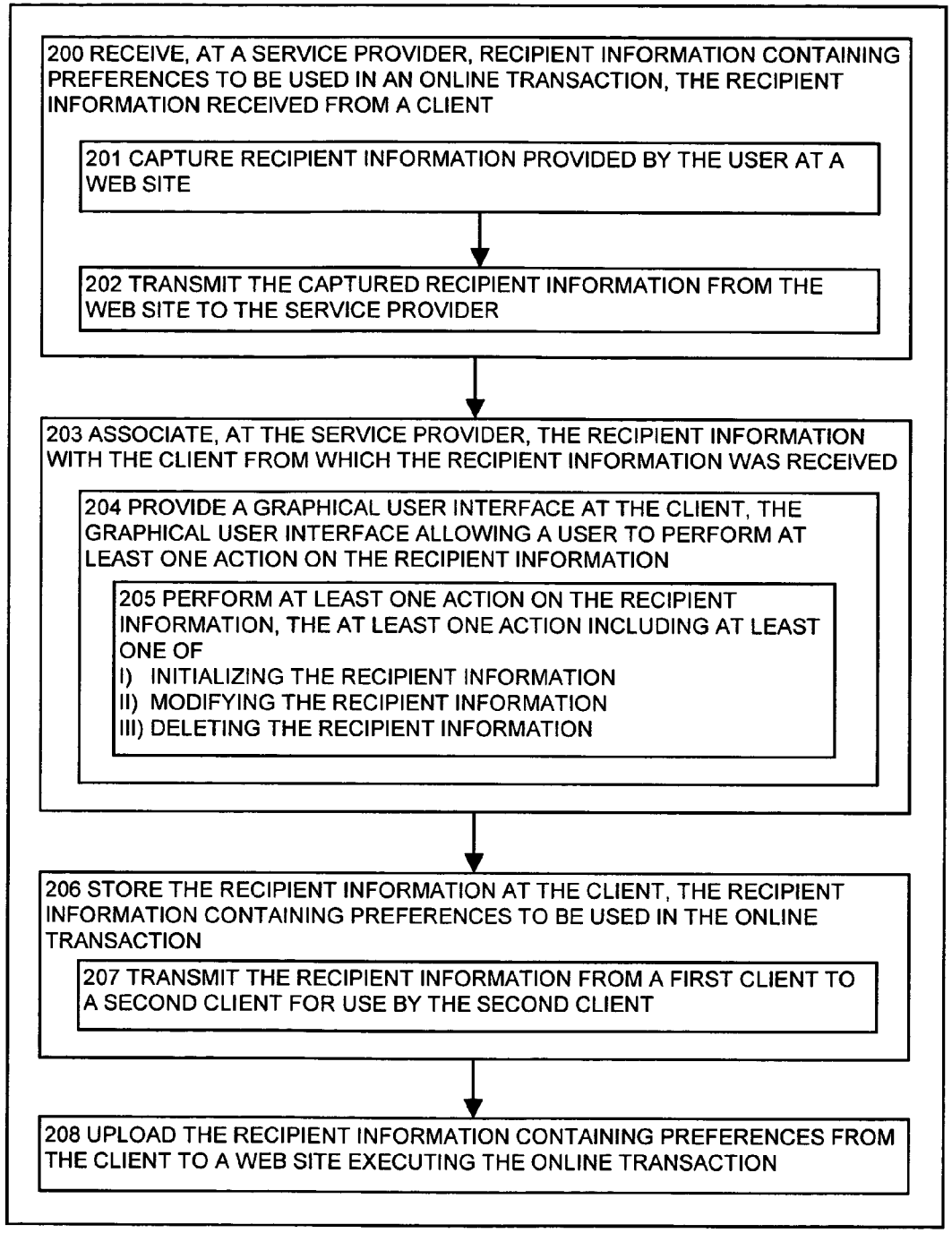
FIG. 2 illustrates a flowchart of a procedure performed by the system of FIG. 1 when the online preference providing process receives, at a service provider, recipient information containing preferences to be used in an online transaction, the recipient information received from a client, according to one embodiment disclosed herein.

FIG. 2 is an embodiment of the steps performed by the online preference providing process 140-2 when it receives recipient information 151-1 associates that recipient information 151-1 with a client 130 from which the recipient information 151-1 was received, and stores the recipient information 151-1 at the client 130.

In step 200, the online preference providing process 140-2 receives, at a service provider 110, recipient information 151-1 containing preferences 152-N to be used in an online transaction at a web site 170. The recipient information 151-1 is received from a client 130. In an example configuration, the user 108 is ordering items from the web site 170 for the recipient. The recipient information 151-1 could include the recipient's shipping address, including information such as the recipient has a Post Office box, and cannot receive packages shipped via any other method, other than via the Post Office. In an example configuration, the preferences 152-N could include information such as the recipient's clothing size and preferred colors. Or, the preferences 152-N could include information such as the recipient has nut allergies, and therefore, cannot receive food gifts containing nuts.

In step 201, the online preference providing process 140-2 captures recipient information 151-N provided by the user 108 at a web site 170. In an example configuration, the user is making a purchase online at a web site 170, and enters recipient information 151-N (i.e., the recipient's shipping address, clothing sizes, color preferences, etc.). The online preference providing process 140-2 captures this recipient information 151-N by providing the user 108 with a prompt that asks the user 108 if this information should be captured as recipient information 151-N. When the user 108 confirms this step, the online preference providing process 140-2 captures the recipient information 151-N.

In step 202, the online preference providing process 140-2 transmits the captured recipient information 151-N from the web site to the service provider 110. The captured recipient information 151-N is transmitted via a cookie 150-1 containing the recipient information 151-N. In an example configuration, the service provider 110 is executing on the client 130. In another example configuration, the service provider 110 is executing on a system separate from the system on which the client 130 operates, and separate from the system on which the web site 170 is hosted.

In step 203, the online preference providing process 140-2 associates, at the service provider 110, the recipient information 151-N with the client 130 from which the recipient information 151-N was received. In an example configuration, the online preference providing process 140-2 associates the recipient information 151-N entered by the user 108 (via the client 130) at the web site 170 with that client 130.

In step 204, the online preference providing process 140-2 provides a graphical user interface 160 at the client 130. The graphical user interface 160 allows a user 108 to perform at least one action on the recipient information 151-N. In an example configuration, the online preference providing process 140-2 provides a graphical user interface 160 for use by the user 108, at the client 130 to perform actions on the recipient information 151-N. The user 108 can use the graphical user interface 160 to perform the actions described in further detail in sub step 205.

In step 205, the online preference providing process 140-2 perform at least one action on the recipient information 151-N, including at least one of:
  i) Initializing the recipient information 151-N. In an example configuration, the user 108 enters the recipient information 151-N via the web site 170 on which the user 108 is making an online transaction. In this scenario, the recipient information 151-N is transmitted to the client 130, and stored within a cookie 150-1 on the client 130. In another example configuration, a user 108 uses the graphical user interface 160 to enter recipient information 151-N for a new recipient prior to going to the web site 170 to make an online purchase using the recipient information 151-N.
  ii) Modifying the recipient information 151-N. In an example configuration, the recipient information 151-N is stored in a cookie 150-1 on the client 130. The user 108 uses the graphical user interface 160 to modify the recipient information 151-N. For example, if the recipient information 150-N contains a shipping address, and the recipient associated with that shipping address has moved, then the user 108 can modify the recipient information 151-N to include the updated shipping address.
  iii) Deleting the recipient information 151-N. In an example configuration, the recipient information 151-N is stored in a cookie 150-1 on the client 130. The user 108 uses the graphical user interface 160 to delete the recipient information 151-N. For example, the user 108 can delete all the recipient information 151-N pertaining to a recipient.

In step 206, the online preference providing process 140-2 stores the recipient information 151-N at the client 130. The recipient information 151-N contains preferences 152-N to be used in the online transaction on the web site 170. In an example configuration, the preferences 152-N contain information related to the clothing sizes and color preferences of the recipient. The recipient information 151-N containing the preferences 152-N are contained within the cookie 150-1 that is stored at the client 130.

In step 207, the online preference providing process 140-2 transmits the recipient information 151-N from a first client 130 to a second client 130 for use by the second client 130. In an example configuration, a user 108 maintaining the recipient information 151-N on a first client 130, such as a desktop computer, wishes to transfer that recipient information 151-N to a second client 130, such as a laptop computer. The online preference providing process 140-2 transmits the recipient information 151-N from the desktop (i.e., the first client 130) to the laptop (i.e., the second client 130).

In step 208, the online preference providing process 140-2 uploads the recipient information 151-N containing preferences 152-N from the client 130 to a web site 170 executing the online transaction. In an example configuration, the user 108 is making an online transaction on the web site 170, and the online preference providing process 140-2 uploads the recipient information 151-N (containing the preferences 152-N) from the client 130 to a web site 170. For example, the user 108 selects at least one recipient and a product category on the web site 170. The online preference providing process 140-2 provides suggested products, including suggested colors, sizes, etc. In an example configuration, the web site 170 to which the recipient information 151-N was uploaded is a different web site 170 from which the recipient information 151-N was captured.

FIG. 3 is an embodiment of the steps performed by the online preference providing process 140-2 when it associates the recipient information 151-N with the client 130 from which the recipient information 151-N was received, and associates a unique identifier 153-1 with that recipient information 151-N.

In step 209, the online preference providing process 140-2 associates, at the service provider 110, the recipient information 151-N with the client 130 from which the recipient information 151-N was received. In an example embodiment, a user 108 is making an online transaction at a web site 170. The user 108 enters information (at the web site 170) relating to preferences 152-N for a recipient. The preferences 152-N are contained within the recipient information 151-N, and the online preference providing process 140-2 associates the recipient information 151-N with the client 130 on which the user 108 is making the online transaction. Thus, the online preference providing process 140-2 associates the recipient information 151-N with the client 130.

In step 210, the online preference providing process 140-2 establishes a unique identifier 153-1 for the recipient information 151-N. In an example embodiment, the online preference providing process 140-2 establishes a unique identifier 153-1 for each recipient information 151-1 that is captured, either via the web site 170 (on which the user 108 is making an online transaction), or via the graphical user interface 160 at the client 130.

In step 211, the online preference providing process 140-2 associates the unique identifier 153-1 with the recipient information 151-N, the web site 170, and/or the client 130. In an example configuration, the online preference providing process 140-2 associates the unique identifier 153-1 with the recipient information 151-N as detailed in step 210. In another example configuration, the online preference providing process 140-2 associates the unique identifier 153-1 with the web site 170 on which the recipient information 151-N was captured. In other words, the user 108 makes an online transaction at a web site 170, and recipient information 151-N is captured and stored, as a cookie 150-1, at the client 130. The cookie 150-1 contains a unique identifier 153-1 along with the recipient information 151-N. The online preference providing process 140-2 associates the unique identifier 153-1 with the web site 170 on which the recipient information 151-N was captured. In yet another example configuration, the online preference providing process 140-2 associates unique identifier 153-1 with the client 130 on which the recipient information 151-N is stored. The recipient information 151-N is captured, and contained within a cookie 150-1 that is stored at the client 130. The online preference providing process 140-2 associates the unique identifier 153-1 (associated with the recipient information 151-N) with the client 130 on which the recipient information 151-N is stored.

Alternatively, in step 212, the online preference providing process 140-2 establishes a unique identifier 153-1 for each recipient contained within the plurality of recipients. In an example embodiment, there is a plurality of recipients for whom recipient information 151-N is captured. The online preference providing process 140-2 establishes a unique identifier 153-1 for each of the recipients within the plurality of recipients. In other words, a user 108 makes an online transaction at a web site 170 for multiple recipients (for example, purchasing items online for multiple relatives who live in various parts of the country). The online preference providing process 140-2 captures the recipient information 151-N for each of the multiple recipients, and stores the recipient information in at least one cookie 150-1. For each of the multiple recipients, the online preference providing process 140-2 establishes a unique identifier 153-1.

In step 213, the online preference providing process 140-2 establishes a unique preference identifier 153-1 for each of the plurality of preferences 152-N associated with each recipient contained within the plurality of recipients. In an example embodiment, a user 108 is making online transactions on a web site 170 for multiple recipients. Each recipient has multiple preferences 152-N (i.e., "Sis" prefers wallet size photographs and eight by ten inch photographs, along with coffee mugs). The recipient information 151-N associated with each respective recipient is captured within a cookie 150-1 that is stored at the client 130. Each recipient information 151-1 can contain multiple preferences 152-N for each recipient. The online preference providing process 140-2 establishes a unique preference identifier 153-1 for each of the multiple preferences 152-N associated with each recipient contained within the plurality of recipients that is contained within at least one cookie 150-1 stored at the client 130.

FIG. 4 is an embodiment of the steps performed by the online preference providing process 140-2 when it associates, at the service provider 110, the recipient information 151-N with the client 130 from which the recipient information 151-N was received, and receives, from the user 108, a policy 154-1 to be applied to the recipient information 151-N.

In step 214, the online preference providing process 140-2 associates, at the service provider 110, the recipient information 151-N with the client 130 from which the recipient information 151-N was received. In an example configuration, the online preference providing process 140-2 associates the recipient information 151-N entered by the user 108 (via the client 130) at the web site 170 with that client 130. In another example configuration, the online preference providing process 140-2 associates the recipient information 151-N entered by the user 108 via the graphical user interface 160 with that client 130. The recipient information 151-N can be entered by the user 108 in the graphical user interface 160 at the client 130, or remotely, from another computer system.

In step 215, the online preference providing process 140-2 receives from a user 108, a policy 154-N to be associated with the recipient information 151-N. In an example configuration, each recipient information 151-1 can contain multiple preferences 152-N for each recipient. The user 108 can specify a policy 154-1, or multiple policies 154-N to be associated with the recipient information 154-N. For example, a policy 154-1 may specify an order in which the preferences 152-N (associated with a recipient) are to be ordered. For example, a recipient may prefer to receive items in red, but may also like items in blue and green, if red is not available. Thus, a policy 154-1 can be applied to the recipient information 151-N that states the recipient information 154-N containing preferences 152-N (i.e., preference 152-1=red, preference 152-2=blue, preference 152-3=green) should give preference 152-1 (i.e., red) a higher priority than preferences 152-2 (i.e., blue) and 152-3 (i.e., green), but that preferences 152-2 (i.e., blue) and 152-3 (i.e., green) should be given equal priority behind preference 152-1 (i.e., red).

In step 216, the online preference providing process 140-2 identifies one of the preferences within the plurality of preferences 152-N as a default preference 155-1. In an example configuration, a user 108 is making an online transaction at a photograph processing web site 170. The user 108 identifies recipient information 151-N for a plurality of recipients. The recipient information 151-1 for each respective recipient can specify multiple preferences 152-N (i.e., wallet size photographs, eight by ten inch photographs, etc). The user 108 can specify which of these preferences 152-N is the preferred preference 152-1 (i.e., the wallet size photographs), and the online preference providing process 140-2 identifies the preferred preference 152-1 as the default preference 155-1.

In step 217, the online preference providing process 140-2 associates the default preference 155-1 with the respective recipient associated with the plurality of preferences 152-N. In an example configuration, a user 108 is making an online transaction at a photograph processing web site 170. The user 108 identifies recipient information 151-N for a plurality of recipients. The recipient information 151-1 for each respective recipient can specify multiple preferences 152-N (i.e., wallet size photographs, eight by ten inch photographs, etc). The user 108 can specify which of these preferences 152-N is the preferred preference 152-1 (i.e., the wallet size photographs), and the online preference providing process 140-2 identifies the preferred preference 152-1 as the default preference 155-1. Thus, when the user 108 makes an online transaction at the photograph processing web site 170, the wallet size photographs will be the default option for the recipient identified by the recipient information 151-1.

In step 218, the online preference providing process 140-2 establishes a unique default preference identifier 156-1 with the default preference 155-1. The default preference 155-1 is associated with the respective recipient associated with the plurality of preferences 152-N. In an example configuration, the user 108 makes an online transaction at the photograph processing web site 170, and identifies recipient information 151-N for a plurality of recipients. The recipient information 151-1 for each of those recipients can contain a plurality of preferences 152-N. One preference 152-1 can be identified as the default preference 155-1. The online preference providing process 140-2 establishes a unique default preference identifier 156-1 with the default preference 155-1. The unique default preference identifier 156-1 is stored with the recipient information 151-1 within the cookie 150-1 that is stored at the client 130.

Alternatively, in step 219, the online preference providing process 140-2 associates at least one preference 152-1 from the plurality of preferences 152-N with the recipient information 151-N associated with the plurality of recipients. In an example configuration, a user 108 is making an online transaction at a photograph processing web site 170. The user 108 identifies recipient information 151-N for a plurality of recipients. The recipient information 151-1 for each respective recipient can specify multiple preferences 152-N. The user 108 can also specify one preference 152-1 to be applied to all the recipients, such as all recipients will receive photographs with a glossy finish. The online preference providing process 140-2 associates the preference 152-1 (i.e., all photographs will have a glossy finish) with the recipient information 151-N associated with the plurality of recipients.

Figure 5:
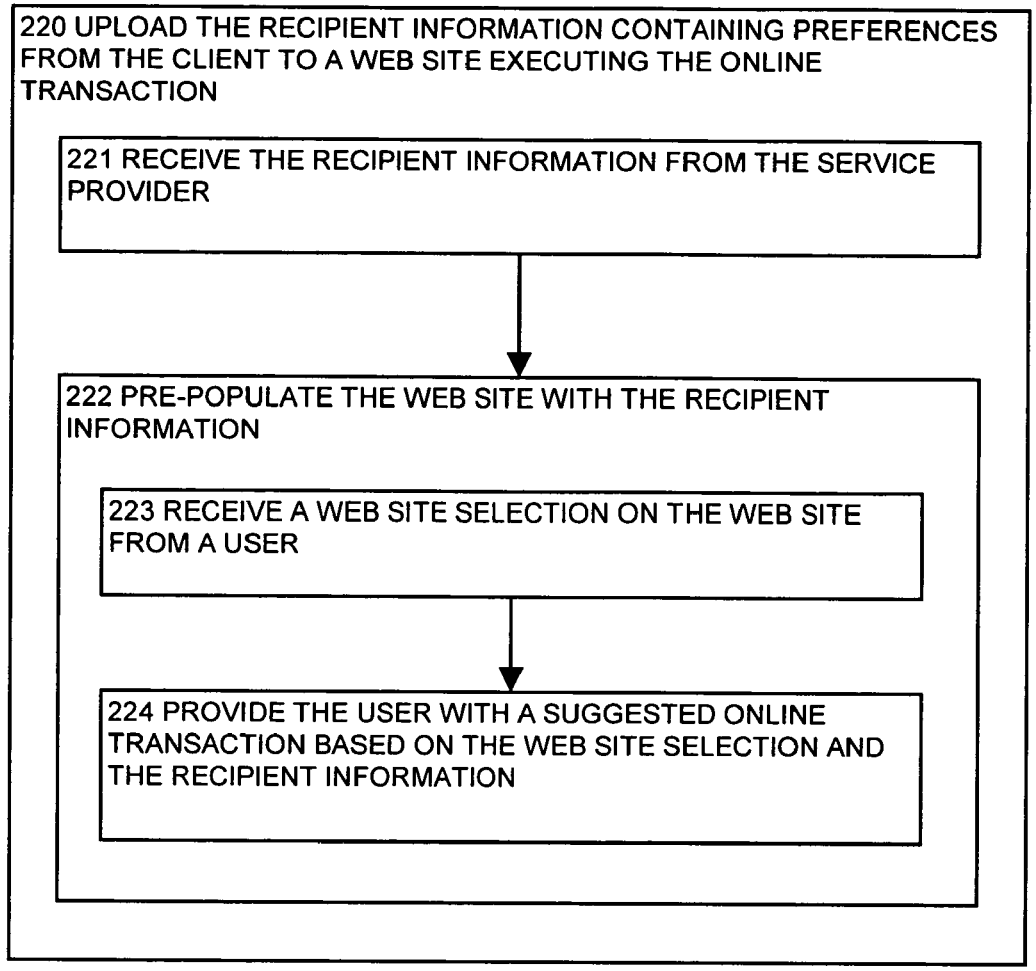
FIG. 5 illustrates a flowchart of a procedure performed by the system of FIG. 1 when the online preference providing process associate at least one preference from the plurality of preferences with the recipient information associated with the plurality of recipients, according to one embodiment disclosed herein.

FIG. 5 is an embodiment of the steps performed by the online preference providing process 140-2 when it uploads the recipient information 151-N client 130 to a web site 170, and pre-populates the web site 170 with the recipient information 151-N.

In step 220, the online preference providing process 140-2 uploads the recipient information 151-N, containing preferences 152-N from the client 130 to a web site 170 executing the online transaction. In an example configuration, the online preference providing process 140-2 transmits the recipient information 151-N to the web site 170 on which the recipient information 151-1 was originally captured. Thus, the user 108 has recipient information 151-1 relating to previous purchases on that web site 170. In another example configuration, the online preference providing process 140-2 transmits the recipient information 151-N to a different web site 170 from which the recipient information 151-1 was originally captured. Thus, the user 108 can upload recipient information 151-N and make a comparison between the two web sites 170 (i.e., compare item choices, color selections, prices, etc.). In an example configuration, the same cookie 150-1 can be uploaded to different websites 170 to perform this comparison.

In step 221, the online preference providing process 140-2 receives the recipient information 151-N from the service provider. In an example configuration, the recipient information 151-N is stored within a cookie 150-1 on the client. During the upload of the recipient information 151-N to the web site 170 executing the online transaction, the online preference providing process 140-2 receives the recipient information 151-1 from the client 130 from the service provider 110.

In step 222, the online preference providing process 140-2 pre-populates the web site 170 with the recipient information 151-N. In an example configuration, the user 108 is making an online transaction on the web site 170, and the online preference providing process 140-2 pre-populates the web site 170 with the recipient information 151-N, such as the recipients' preferences 152-N (i.e., clothing sizes, color choices, etc).

In step 223, the online preference providing process 140-2 receives a web site selection on the web site 170 from a user 108. In an example configuration, the user 108 is making an online transaction at a photograph processing web site 170. The user 108 selects photographs to print, and selects wallet sized photographs. The online preference providing process 140-2 receives the web site selection (of the wallet sized photographs).

In step 224, the online preference providing process 140-2 provides the user 108 with a suggested online transaction, based on the web site selection, and the recipient information 151-N. In an example configuration, the user 108 is making an online transaction at a photograph processing web site 170. The user 108 selects photographs to print, and selects wallet sized photographs. The online preference providing process 140-2 receives the web site selection (of the wallet sized photographs). The online preference providing process 140-2 provides the user 108 with a list of recipients who have recipient information 151-N with preferences 152-N associated with wallet sized photographs. Thus, when the user 108 selects wallet sized photographs, the user 108 is prompted with a list of recipients who prefer to receive wallet sized photographs.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

The invention claimed is:

1. A method in which at least one computer system accesses instructions from computer storage and executes the instructions to perform steps comprising:

receiving recipient information during a first online transaction at a service provider, the first online transaction comprising a purchase of a first product for at least one third party by a client, the recipient information containing at least one preference of the third party, wherein receiving the third party preference includes: receiving at least one product customization to be applied to the first product purchased during the first online transaction, the product customization comprising a desired product attribute;

creating an association between the recipient information and the client;

saving the recipient information and the association in a cookie stored at the client; and during a second online transaction wherein the client purchases a second product for the third party:
(i) receiving the cookie from the client;
(ii) upon detecting the association between the client and the recipient information, obtaining the third party's preference from the cookie; and
(iii) applying the third party's preference to the purchase of the second product in the second online transaction, wherein applying the third party's preference includes: receiving an order for an instance of the second product having the desired product attribute;

wherein receiving an order for the instance of the second product includes: receiving a request to purchase the instance of the second product, wherein the second product differs from the first product, the second product and first product both have at least one customizable product feature that corresponds to the desired product attribute indicated by the third party's preference.

2. The method of claim 1 wherein associating the recipient information comprises:
providing a graphical user interface at the client, the graphical user interface allowing a user to perform at least one action on the recipient information, the at least one action including at least one of:
  i) initializing the recipient information;
  ii) modifying the recipient information; and
  iii) deleting the recipient information.

3. The method of claim 1 wherein associating the recipient information with the client comprises:
establishing a unique identifier for the recipient information, wherein establishing the unique identifier for the recipient information comprises:
associating the unique identifier with:
  i) the recipient information;
  ii) a web site on which the recipient information was captured; and
  iii) the client on which the recipient information is stored.

4. The method of claim 3 wherein the recipient information is associated with a plurality of recipients, and wherein establishing a unique identifier for the recipient information comprises:
establishing a unique identifier for each third party contained within the plurality of recipients.

5. The method of claim 4 wherein each of the plurality of recipients contain a plurality of preferences to be used in the online transaction and wherein establishing a unique identifier for each recipient contained within the plurality of recipients comprises:
establishing a unique preference identifier for each of the plurality of preferences associated with each recipient contained within the plurality of recipients.

6. The method of claim 1 wherein associating the recipient information with the client comprises:
receiving from a user, a policy to be associated with the recipient information, wherein the recipient information is associated with a plurality of third parties and wherein the plurality of third parties contain a plurality of preferences to be used in the online transaction and wherein receiving the policy comprises:

identifying one of the plurality of preferences as a default preference;
associating the default preference with the respective third party associated with the plurality of preferences; and
establishing a unique default preference identifier with the default preference associated with the respective third party associated with the plurality of preferences.

7. The method of 6 wherein the recipient information is associated with a plurality of third parties and wherein the plurality of third parties contain a plurality of preferences to be used in the online transaction and wherein receiving from the user, a policy to be associated with the recipient information comprises:
associating at least one preference from the plurality of preferences with the recipient information associated with the plurality of third parties.

8. The method of claim 1 comprising:
uploading the recipient information containing preferences from the client to a web site executing the online transaction, wherein uploading the recipient information comprises:
receiving the recipient information from the service provider; and
pre-populating the web site with the recipient information, wherein pre-populating the web site comprises:
receiving a web site selection on the web site from a user; and
providing the user with a suggested online transaction based on the web site selection and the recipient information.

9. A computerized device comprising:
a memory;
a processor;
a communications interface;
an interconnection mechanism coupling the memory, the processor and the communications interface;
wherein the memory is encoded with a online preference providing application that when executed on the processor provides online preferences on the computerized device by performing the operations of: receiving recipient information during a first online transaction at a service provider, the first online transaction comprising a purchase of a first product for at least one third party by a client, the recipient information containing at least one preference of the third party, wherein receiving the third party preference includes: receiving at least one product customization to be applied to the first product purchased during the first online transaction, the product customization comprising a desired product attribute;
creating an association between the recipient information and the client;
saving the recipient information and the association in a cookie stored at the client; and
during a second online transaction wherein the client purchases a second product for the third party:
(i) receiving the cookie from the client;
(ii) upon detecting the association between the client and the recipient information, obtaining the third party's preference from the cookie; and
(iii) applying the third party's preference to the purchase of the second product in the second online transaction, wherein applying the third party's preference includes: receiving an order for an instance of the second product having the desired product attribute;
wherein receiving an order for the instance of the second product includes: receiving a request to purchase the instance of the second product, wherein the second product differs from the first product, the second product and first product both have at least one customizable product feature that corresponds to the desired product attribute indicated by the third party's preference.

10. The computerized device of claim 9 wherein the computerized device performs the operation of:
uploading the recipient information containing preferences from the client to a web site executing the online transaction, the computerized device further performs the operations of:
receiving the recipient information from the service provider; and
pre-populating the web site with the recipient information.

11. The computerized device of claim 9 wherein when the computerized device performs the operation of associating, at the service provider, the recipient information with the client from which the recipient information was received, the computerized device performs the operation of:
providing a graphical user interface at the client, the graphical user interface allowing a user to perform at least one action on the recipient information.

12. A computer readable medium encoded with computer programming logic that when executed on a process in a computerized device produces an online preference providing process that provides online preferences by causing the computerized device to perform the operations of:
receiving recipient information during a first online transaction at a service provider, the first online transaction comprising a purchase of a first product for at least one third party by a client, the recipient information containing at least one preference of the third party, wherein receiving the third party preference includes: receiving at least one product customization to be applied to the first product purchased during the first online transaction, the product customization comprising a desired product attribute;
creating an association between the recipient information and the client;
saving the recipient information and the association in a cookie stored at the client; and
during a second online transaction wherein the client purchases a second product for the third party:
(i) receiving the cookie from the client;
(ii) upon detecting the association between the client and the recipient information, obtaining the third party's preference from the cookie; and
(iii) applying the third party's preference to the purchase of the second product in the second online transaction, wherein applying the third party's preference includes: receiving an order for an instance of the second product having the desired product attribute;
wherein receiving an order for the instance of the second product includes: receiving a request to purchase the instance of the second product, wherein the second product differs from the first product, the second product and first product both have at least one customizable product feature that corresponds to the desired product attribute indicated by the third party's preference.

13. The method as in claim 1, wherein receiving recipient information at the service provider includes: receiving the recipient information from a user at the client, the user being different than the third party.

14. The method as in claim 1, wherein the first product comprises image content, the image content comprising first digital image content;
wherein receiving the recipient information includes:
receiving a first preference for a first rendition of the image content ordered for the third party by a user at the client; and
receiving a second preference for a second rendition of the image content ordered for an additional third party by the user.

15. The method as in claim 14, wherein receiving the first preference comprises receiving a first image print characteristic; and
wherein receiving the second preference comprises receiving a second image print characteristic, the first image print characteristic being different than the second image print characteristic.

16. The method as in claim 14, wherein saving the recipient information and the association in the cookie stored at the client includes:
saving the first preference as associated with the third party in the cookie at the client; and
saving the second preference as associated with the additional third party in the cookie.

17. The method as in claim 16, comprising:
wherein saving the first preference in the cookie occurs upon receiving an indication from the client that the first preference should be retained for subsequent online transactions involving the third party; and
wherein saving the second preference in the cookie occurs upon receiving an indication from the client that the second preference should be retained for subsequent online transactions involving the additional third party.

18. The method as in claim 16, during execution of the second online transaction, wherein the second product comprises second image content different than the image content, the second image content comprising second digital image content different than the first digital image content:
upon detecting a purchase for the third party by the user at the client, applying the first preference to an order for a first rendition of the second image content, the order for the first rendition of the second image content associated with the third party; and
upon detecting a purchase for the additional third party by the user at the client, applying the second preference to an order for a second rendition of the second image content, the order for the second rendition of the second image content associated with the additional third party.

19. The method as in claim 18, comprising:
wherein applying the first preference includes customizing the first rendition of the second image content according to the first preference of the third party after extracting the first preference from the cookie; and
wherein applying the second preference includes customizing the second rendition of the second image content according to the second preference of the additional third party after extracting the second preference from the cookie.

20. The method as in claim 1, comprising:
wherein receiving the preference of the third party includes: receiving a selection of multiple, prioritized preferences; and
wherein applying the preference to the purchase of the second product in the second online transaction includes:
identifying an available first product customization offered by the service provider that matches a first prioritized preference; and upon determining all other available product customizations offered by the service provider correspond to prioritized preferences with a lower priority than the first prioritized preference, creating an order for the second product customized according to the first product customization.

21. The method as in claim 1, comprising:

wherein the first product comprises at least one print of first digital image content;

wherein the second product comprises at least one print of second digital image content, the first digital image content different than the second digital image content;

wherein the desired product attribute comprises at least one image print size preferred by the third party; and wherein at least one of the first digital image content and the second digital image content is created by a source other than the third party.

* * * * *